(12) United States Patent
Miller et al.

(10) Patent No.: US 9,781,040 B2
(45) Date of Patent: Oct. 3, 2017

(54) CONGESTION DETECTION BASED ON RESOURCE UTILIZATION INFORMATION AND USER QUALITY-OF-EXPERIENCE INDICATORS

(71) Applicants: Scott Corey Miller, Freehold, NJ (US); Susan Wu Sanders, Bridgewater, NJ (US); Jin Cao, Edison, NJ (US)

(72) Inventors: Scott Corey Miller, Freehold, NJ (US); Susan Wu Sanders, Bridgewater, NJ (US); Jin Cao, Edison, NJ (US)

(73) Assignee: Alcatel-Lucent USA Inc., Boulogne-Billancourt (FR)

(*) Notice: Subject to any disclaimer, the term of this patent is extended or adjusted under 35 U.S.C. 154(b) by 140 days.

(21) Appl. No.: 13/963,204

(22) Filed: Aug. 9, 2013

(65) Prior Publication Data
US 2015/0043346 A1    Feb. 12, 2015

(51) Int. Cl.
| | |
|---|---|
| *H04L 12/801* | (2013.01) |
| *H04W 28/02* | (2009.01) |
| *H04L 12/803* | (2013.01) |
| *H04L 12/851* | (2013.01) |

(52) U.S. Cl.
CPC ........... *H04L 47/122* (2013.01); *H04L 47/11* (2013.01); *H04L 47/24* (2013.01); *H04W 28/0284* (2013.01)

(58) Field of Classification Search
None
See application file for complete search history.

(56) References Cited

U.S. PATENT DOCUMENTS

| | | | |
|---|---|---|---|
| 2012/0124238 A1 | 5/2012 | Nandagopal | |
| 2013/0301415 A1* | 11/2013 | Archer et al. | 370/235 |
| 2014/0036667 A1* | 2/2014 | Balasubramanian et al. | 370/230 |
| 2014/0286164 A1* | 9/2014 | Mahindra | H04L 47/19 370/235 |

OTHER PUBLICATIONS

L. Ye, "MBB Service Differentiation for Cell Congestion Control," in *Communicate*, Issue 56, Jun. 2010.

* cited by examiner

*Primary Examiner* — Robert C Scheibel
(74) *Attorney, Agent, or Firm* — Tong, Rea, Bentley & Kim, LLC

(57) ABSTRACT

A capability is provided for detecting congestion in a communication network. A congestion condition is detected for the network based on resource utilization information associated with the network and a set of user quality-of-experience (QoE) indicators associated with the network. An indication of congestion in the network is detected based on resource utilization information associated with the network and a determination as to whether or not to generate detect a congestion condition for the network is made based on one or more user QoE indicators associated with the network. An indication of congestion in the network is detected based on resource utilization information associated with the network and a determination as to whether or not to generate a congestion alert for the indication of congestion in the network is made based on one or more user QoE indicators associated with the network.

25 Claims, 4 Drawing Sheets

CONGESTION DETECTION BASED ON RESOURCE UTILIZATION INFORMATION AND USER QUALITY-OF-EXPERIENCE INDICATORS

TECHNICAL FIELD

The disclosure relates generally to communication networks and, more specifically but not exclusively, to detection of congestion in communication networks.

BACKGROUND

In many types of communication networks, including wireline and wireless networks, detection and management of congestion is used to improve the performance of the communication network. The conventional basis for detecting congestion in a wireless network, such as a Long Term Evolution (LTE) wireless network and other types of wireless networks, is resource utilization of the wireless network. In LTE networks, for example, the air interface utilization of the LTE network is typically used for detecting congestion in the LTE network, since the air interface capacity is normally the limiting factor for communications in LTE networks. In a cell of an LTE network, for example, the average Physical Resource Block (PRB) utilization on the forward link for the cell reflects the cell loading condition of the cell. For a 10 MHz LTE network, there is a total of 50 PRBs which can provide, on average, an average aggregate downlink throughput of 12 Mbps per cell. Thus, the conventional basis for detecting congestion in an LTE cell is the PRB utilization of the LTE cell.

SUMMARY OF EMBODIMENTS

Various deficiencies in the prior art are addressed by embodiments for detecting congestion in a communication network.

In at least some embodiments, an apparatus includes a processor and a memory communicatively connected to the processor, where the processor is configured to detect an indication of congestion in the network based on resource utilization information associated with the network, and determine, based on evaluation of one or more user quality-of-experience (QoE) indicators associated with the network, whether to detect a congestion condition for the detected indication of congestion in the network.

In at least some embodiments, a method includes using a processor and a memory for detecting an indication of congestion in the network based on resource utilization information associated with the network, and determining, based on evaluation of one or more user quality-of-experience (QoE) indicators associated with the network, whether to detect a congestion condition for the detected indication of congestion in the network.

In at least some embodiments, a computer-readable storage medium stores instructions which, when executed by a computer, cause the computer to perform a method including detecting an indication of congestion in the network based on resource utilization information associated with the network, and determining, based on evaluation of one or more user quality-of-experience (QoE) indicators associated with the network, whether to detect a congestion condition for the detected indication of congestion in the network.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A congestion detection capability is presented herein. The congestion detection capability supports detection of congestion in a communication network (e.g., a wireless network, a wireline network, or the like). In at least some embodiments, the congestion detection capability supports detection of congestion in a communication network based on a combination of resource utilization of the communication network and one or more user quality-of-experience (QoE) indicators associated with the communication network. In at least some embodiments, the congestion detection capability supports more accurate detection of congestion in a communication network. In at least some embodiments, the congestion detection capability supports real-time or near-real-time detection of congestion in a communication network. In at least some embodiments, the congestion detection capability supports real-time or near-real-time detection of "true" congestion in a communication network. These and various other embodiments of the congestion detection capability may be better understood by way of reference to an exemplary wireless communication system including a congestion detection module configured to support detection of congestion in the exemplary wireless communication system, as depicted and described with respect to FIG. 1.

Figure 1:
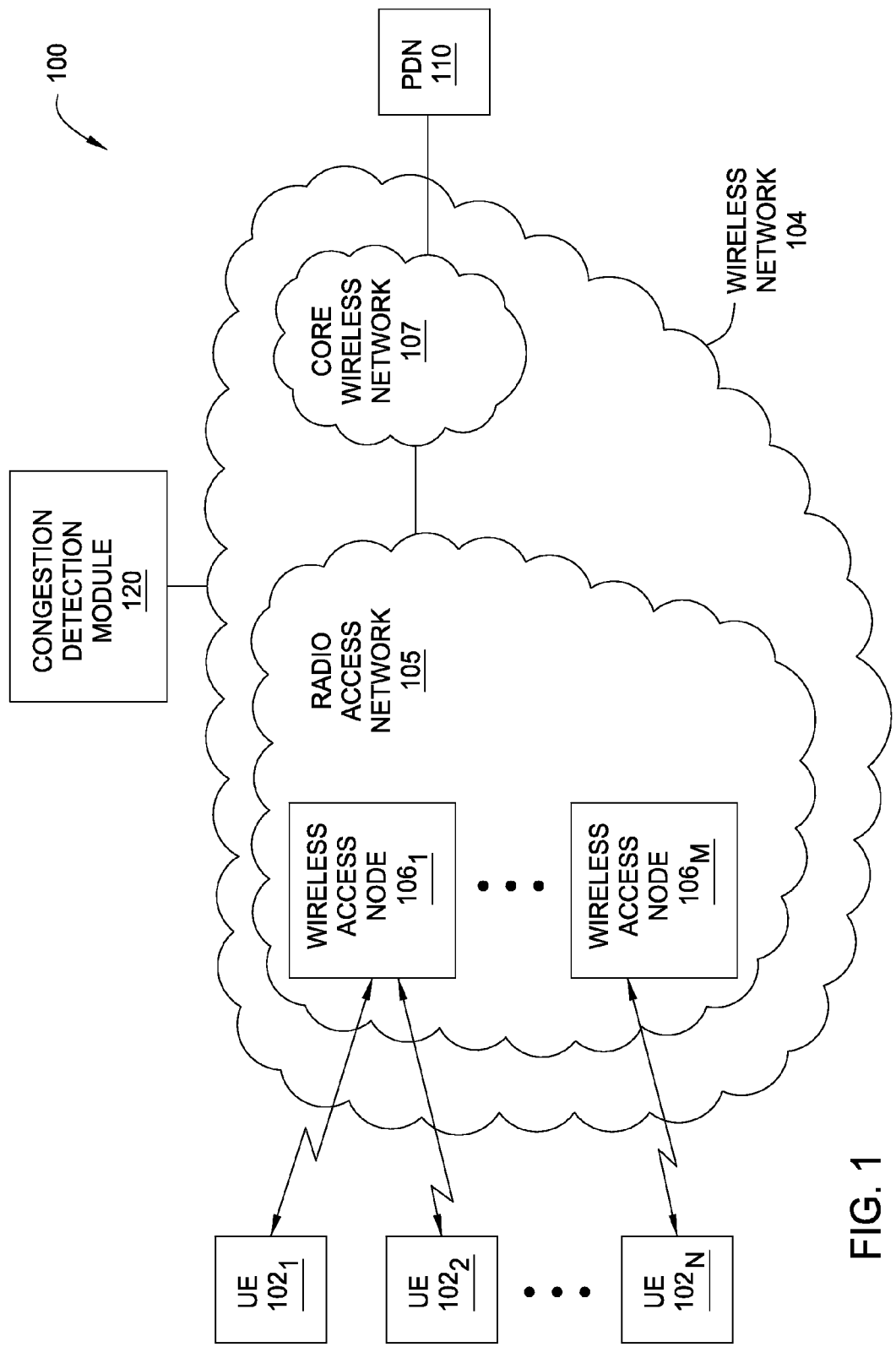
FIG. 1 depicts an exemplary wireless communication system including a congestion detection module configured for detecting congestion in the exemplary wireless communication system.

FIG. 1 depicts an exemplary wireless communication system including a congestion detection module configured for detecting congestion in the exemplary wireless communication system.

The wireless communication system 100 includes a plurality of User Equipments (UEs) $102_1$-$102_N$ (collectively, UEs 102) accessing a wireless network (WN) 104 supporting communications between the UEs 102 and a packet data network (PDN) 110.

The WN 104 includes a radio access network (RAN) 105 and a wireless core network (WCN) 107. The RAN 105 includes a plurality of wireless access nodes (WANs) $106_1$-$106_M$ (collectively, WANs 106) configured to provide access by UEs 102 to WN 104 and, thus, PDN 110. The RAN 105 and WCN 107 may include various other network elements typically deployed in wireless communication networks. It will be appreciated that various aspects of WN 104 (e.g., types of network elements used, configuration, operation, and the like) may vary for different types of wireless communication networks. For a Third Generation (3G) Universal Mobile Telecommunications System (UMTS)

network, for example, WANs 106 may be NodeBs, RAN 105 may include one or more Radio Network Controllers (RNCs), WCN 107 may include one or more Serving General Packet Radio Service (GPRS) Support Nodes (SGSNs) and one or more Gateway GPRS Support Nodes (GGSNs), and the like. For a Fourth Generation (4G) Long Term Evolution (LTE) network, for example, WANs 106 may be eNodeBs and WCN may include one or more Serving Gateways (SGWs), one or more Packet Data Network (PDN) Gateways (PGWs), one or more Mobility Management Entities (MMEs), and the like. It will be appreciated that various aspects of these and other types of wireless communication networks will be understood by one skilled in the art.

The PDN 110 may be any type of packet-based network accessible via a wireless communication network, such as the Internet or any other suitable public or private packet-based network (e.g., a service provider network, a content delivery network, an enterprise network, a data center network, or the like, as well as various combinations thereof).

The wireless communication system 100 also includes a congestion detection module (CDM) 120.

The CDM 120 may be configured to control one or more congestion-related action in WN 104 based on resource utilization information associated with WN 104 and a set of user QoE indicators associated WN 104. It is noted that, in at least some types of wireless networks, use of resource utilization information of a wireless network, by itself, may be insufficient to accurately detect congestion in the wireless network. Namely, in at least some wireless networks, high resource utilization indicative of congestion in the wireless network may result in detection of a congestion condition for the wireless network, and generation of an associated congestion alert for the wireless network, even when the wireless network is not congested. For example, during non-peak hours a wireless network may dedicate most (or even all) of its available resources to a relatively small number of users (e.g., compared to the number of users served at other times) in order to ensure that those few active users have a great user experience during that period. However, this often results in detection of congestion in the wireless network, and generation of an associated congestion alert for the wireless network, even though the wireless network is only serving a small number of users and, thus, should not be considered to be congested. Thus, in at least some embodiments, CDM 120 is configured to control one or more congestion-related actions in WN 104 based on resource utilization information associated with WN 104 and one or more user QoE indicators associated WN 104, where the one or more congestion related actions may include determining whether to detect congestion in WN 104 (e.g., determining whether or not a congestion condition is to be detected when resource utilization information indicates congestion within the network), determining whether to generate a congestion alert for WN 104 (e.g., determining whether or not a congestion alert is to be generated when resource utilization information indicates congestion within the network), or the like, as well as various combinations thereof.

In at least some embodiments, CDM 120 may be configured to evaluate the resource utilization information associated with WN 104 for determining whether the resource utilization information associated with WN 104 indicates the presence of congestion in WN 104, determining a resource utilization level of WN 104, determining a congestion level of WN 104, determining whether a congestion condition is detected for WN 104, or the like. The resource utilization information associated with WN 104 may include any resource utilization information suitable for use in evaluating utilization of resources in WN 104 (e.g., interface utilization information per WAN 106, backhaul resource utilization information for backhaul of communications within RAN 105, processing resource utilization information of one or more elements of WCN 107, or the like, as well as various combinations thereof). The resource utilization information associated with WN 104 may be evaluated in any manner suitable for evaluating resource utilization information (e.g., based on identification of one or more specific resource utilization values, based on comparison of one or more resource utilization values to one or more resource utilization thresholds, or the like, as well as various combinations thereof).

In at least some embodiments, CDM 120 may be configured to evaluate one or more user QoE indicators associated with WN 104 for determining whether a congestion condition is detected for WN 104 based on detection of a resource utilization condition in WN 104, determining whether to generate a congestion alert based on detection of an indication of congestion in WN 104, or the like. The one or more user QoE indicators associated with WN 104 may include one or more parameters, or other information, indicative of the QoE of users of UEs 102 that are accessing the WN 104 (e.g., a user throughput parameter, a round trip time (RTT) parameter, a loss parameter, or the like). The user QoE indicators also may be referred to herein as user experience Key Performance Indicators (KPIs), user QoE KPIs, or using any other suitable term(s). The one or more user QoE indicators associated with WN 104 may be evaluated in any suitable manner (e.g., based on identification of one or more specific user QoE indicator values, based on comparison of one or more user QoE indicator values to one or more associated thresholds, or the like, as well as various combinations thereof).

In at least some embodiments, CDM 120 may be configured to prevent one or more congestion-related actions from being performed for WN 104 based solely on the resource utilization of WN 104, or even to prevent one or more congestion-related actions from being performed for WN 104 based on a combination of resource utilization information associated with WN 104 and one or more user QoE indicators associated WN 104 where the one or more user QoE indicators associated WN 104 do not indicate presence of congestion within WN 104. The one or more congestion-related actions for WN 104 may include one or more of detection of a congestion condition for WN 104, generation of a congestion alert for WN 104, or the like.

The CDM 120 may be configured to detect congestion at various locations within WN 104, such as within RAN 105 (e.g., at air interfaces associated with respective WANs 106, at one or more other nodes within RAN 105, or the like), within WCN 107 (e.g., at an SGSN of a 3G UMTS network or an SGW of an LTE network, at a GGSN of a 3G UMTS network or a PGW of an LTE network, or the like), or the like, as well as various combinations thereof. Accordingly, CDM 120 is depicted as being generally associated with WN 104, which is illustrative that CDM 120 may be deployed at various locations within or in communication with WN 104 (e.g., as modules within each of the WANs 106, as modules within each of the RNCs of RAN 105, as modules deployed within or in communication within RAN 105, as one or more modules within one or more elements of WCN 107, as one or more modules deployed at one more locations within or in communication with WCN 107, or the like, as well as various combinations thereof) for detecting congestion at various locations or levels of granularity within WN 104. It will be appreciated that deployment of CDM 120 in wireless communication system 100 may be dependent on various factors (e.g., the type of resources for which congestion is monitored, the types of user QoE indicators used in order to monitor for congestion, ease of deployment of CDM 120, the manner in which detected congestion conditions are to be handled, or the like, as well as various combinations thereof).

The CDM 120 may be configured to perform congestion management functions in conjunction with detection of a congestion condition (e.g., storing congestion information associated with the congestion condition, propagating information associated with the congestion condition (e.g., to a management system or other suitable type of system), generating a congestion alert message, propagating a congestion alert message, initiation of one or more corrective actions to alleviate the congestion condition, or the like, as well as various combinations thereof).

Figure 2:
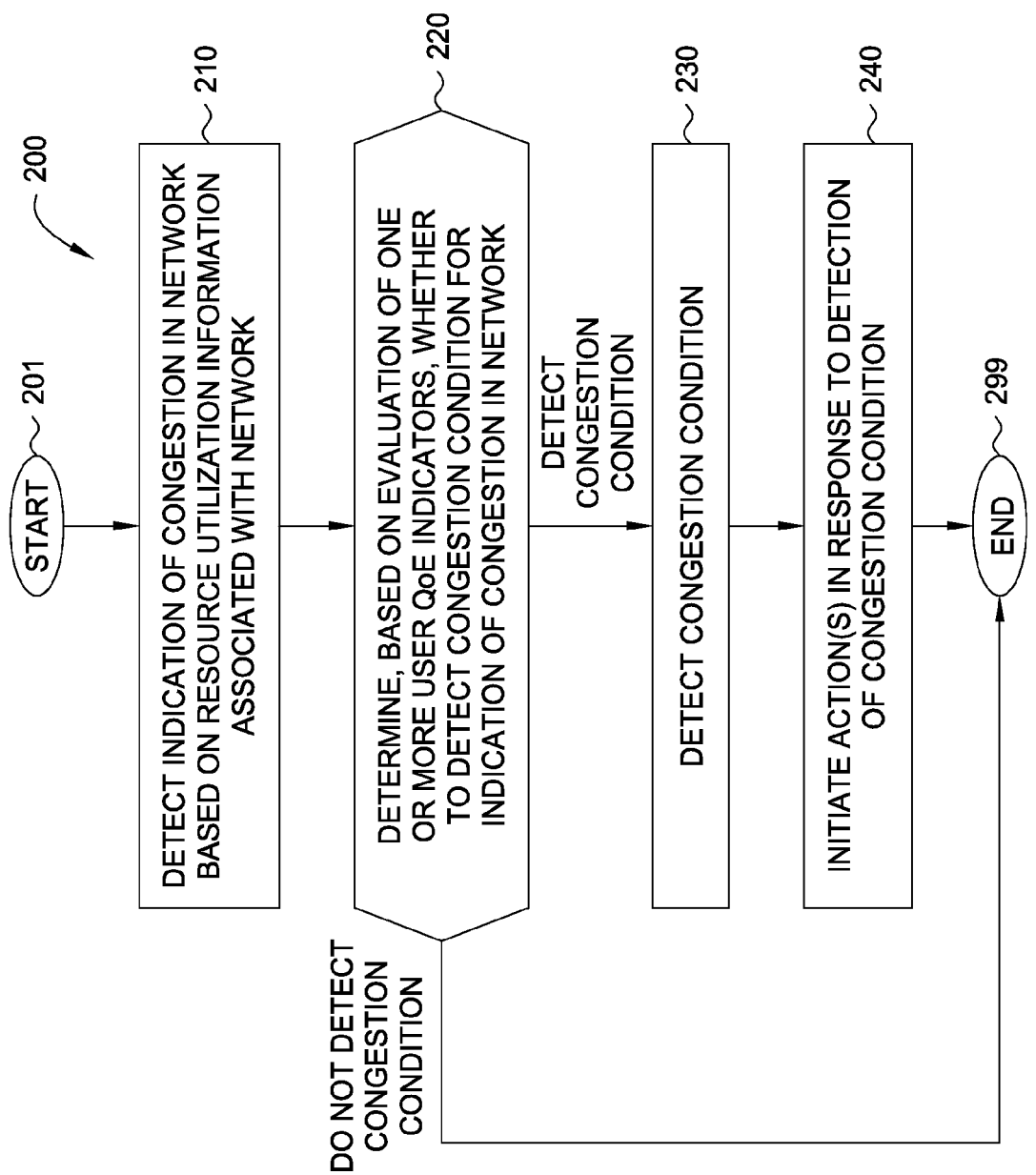
FIG. 2 depicts an exemplary embodiment of a method for detecting congestion in a network based on resource utilization information associated with the network and a set of user quality-of-experience (QoE) indicators associated with the network.
Figure 3:
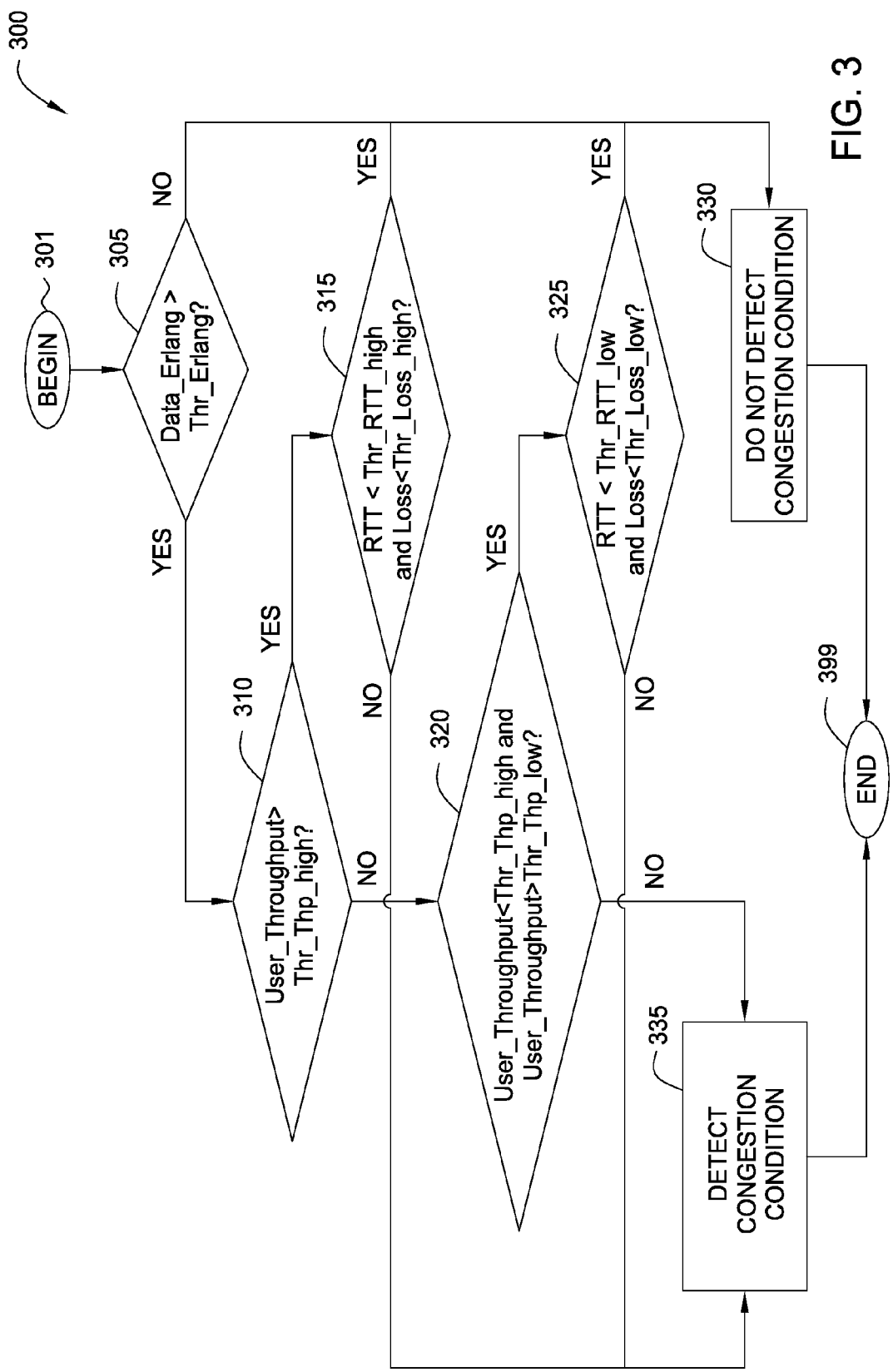
FIG. 3 depicts an exemplary embodiment of a method for detecting congestion in a network based on resource utilization information associated with the network and a set of user quality-of-experience (QoE) indicators associated with the network.

The use of the resource utilization information associated with WN 104 and the set of user QoE indicators associated WN 104 to control one or more congestion-related actions within WN 104 may be better understood by way of reference to FIG. 2 and FIG. 3.

It will be appreciated that, although primarily depicted and described herein with respect to embodiments in which the congestion detection capability is provided within a specific wireless communication system 100, various embodiments of the congestion detection capability may be provided within various other types of communication systems (e.g., other types of wireless communication systems, wireline communication systems, or the like, as well as various combinations thereof).

FIG. 2 depicts an exemplary embodiment of a method for detecting congestion in a network based on resource utilization information associated with the network and a set of user QoE indicators associated with the network. It will be appreciated that, although primarily depicted and described as being performed serially, at least a portion of the steps of method 200 of FIG. 2 may be performed contemporaneously or in a different order than depicted and described with respect to FIG. 2.

At step 201, method 200 begins.

At step 210, an indication of congestion in the network is detected based on resource utilization information associated with the network.

The resource utilization information may be a measure of access resource utilization (e.g., air interface utilization in a wireless network, access interface utilization in a wireline network, or the like), a measure of utilization of bandwidth resources of an access network or core network, or the like, as well as various combinations thereof. The resource utilization information associated with the network may be associated with all or part of the network (e.g., for a single cell of a wireless network, for a set of cells of a wireless network, for a wireless core network, for specific access portions of a wireline network, for a wireline network as a whole, or the like). For example, the resource utilization information may include air interface utilization of a cell of an LTE network (e.g., where the average Physical Resource Block (PRB) utilization on the forward link for the cell reflects the cell loading condition of the cell). The types of resource utilization information relevant for other types of networks will be understood by one skilled in the art. The resource utilization information may include one or more resource utilization values.

The indication of congestion in the network may be detected based on evaluation of the resource utilization information associated with the network. The resource utilization information associated with the network may be evaluated in any suitable manner, which may depend on the type of resource utilization information being evaluated. For example, a resource utilization value (e.g., an air interface utilization value, a backhaul bandwidth utilization value, or the like) may be evaluated by determining whether or not the resource utilization value has a specific value, comparing the resource utilization value to one or more thresholds defined for the type of resource utilization value being evaluated, or the like, as well as various combinations thereof. In at least some embodiments, multiple measures of resource utilization may be evaluated in order to determine whether a congestion condition is detected.

At step 220, a determination is made, based on evaluation of one or more user QoE indicators associated with the network, as to whether or not to detect a congestion condition for the detected indication of congestion. The one or more user QoE indicators may include one or more of a user throughput parameter, an RTT parameter, a loss parameter, or the like. The evaluation of the one or more user QoE indicators associated with the network may be performed in a manner for determining whether or not one or more values of the one or more user QoE indictors indicate a congestion condition in the network. In general, a user QoE indicator may be evaluated in any suitable manner, which may depend on the type of user QoE indicator being evaluated. For example, a user QoE indicator may be evaluated by determining whether or not the value of the user QoE indicator has a specific value (e.g., "yes" or "no", "low" or "high", a specific numeric value, or the like), comparing the value of the user QoE indicator to one or more thresholds defined for the user QoE indicator, or the like, as well as various combinations thereof. In the case of multiple user QoE indicators, the determination as to whether a congestion condition is detected may be made based on evaluation of some or all of the user QoE indicators. In the case of multiple user QoE indicators, the multiple user QoE indicators may be evaluated individually, in one or more combinations, or the like, as well as various combinations thereof. An exemplary embodiment illustrating evaluation of a set of three user QoE indicators is depicted and described with respect to FIG. 3. If a congestion condition is not to be detected, method 200 proceeds to step 299, where method 200 ends. If a congestion condition is to be detected, method 200 proceeds to step 230.

At step 230, a congestion condition is detected for the detected indication of congestion.

At step 240, one or more actions may be initiated in response to detection of the congestion condition. For example, the one or more actions may include storage of information associated with the congestion condition, propagation of information associated with the congestion condition (e.g., to a management system or other suitable type of system), generation of a congestion alert for the congestion condition, propagation of a congestion alert for the congestion condition, initiation of one or more corrective actions to alleviate the congestion condition, or the like, as well as various combinations thereof.

At step 299, method 200 ends.

FIG. 3 depicts an exemplary embodiment of a method for detecting congestion in a network based on resource utilization information associated with the network and a set of user QoE indicators associated with the network. In method 300 of FIG. 3, the resource utilization of the network is measured based on a Data Erlang parameter and the set of user QoE indicators includes a User Throughput KPI, a RTT KPI, and a Loss KPI. It will be appreciated that, although primarily depicted and described as being performed serially, at least a portion of the steps of method 300 of FIG. 3 may be performed contemporaneously or in a different order than depicted and described with respect to FIG. 3.

At step 301, method 300 begins. From step 301, method 300 proceeds to step 305.

At step 305, a determination is made as to whether the value of the Data Erlang parameter is greater than the Data Erlang Threshold (Data_Erlang>Thr_Erlang). For example, the Data Erlang parameter may be indicative of the number of simultaneous users on a given access interface (e.g., on a given cell of a wireless network) and the Data Erlang Threshold may be 20, 40, or any other suitable value. In response to a determination that the value of the Data Erlang parameter is not greater than the Data Erlang Threshold, method 300 proceeds to step 330 where (i.e., a determination is made not to detect a congestion condition since the resource utilization information does not indicate the presence of congestion). In response to a determination that the value of the Data Erlang parameter is greater than the Data Erlang Threshold, method 300 proceeds to step 310 (to initiate evaluation of one or more of user QoE indicators in order to determine whether or not a congestion condition is detected).

At step 310, a determination is made as to whether the value of the User Throughput KPI is greater than the User Throughput High Threshold (User_Throughput>Thr_Thp_high). For example, the User Throughput High Threshold may be 1000 kbps, 1500 Kbps, or any other suitable value. In response to a determination that the value of the User Throughput KPI is greater than the User Throughput High Threshold, method 300 proceeds to step 315. In response to a determination that the value of the User Throughput KPI is not greater than the User Throughput High Threshold, method 300 proceeds to step 320.

At step 315, a determination is made as to whether the value of the RTT KPI is less than the RTT High Threshold (RTT<Thr_RTT_high) and the value of the Loss KPI is less than the Loss High Threshold (Loss<Thr_Loss_high). For example, the RTT High Threshold may be 10,000 ms, 8,000 ms, or any other suitable value. For example, the Loss High Threshold may be 10%, 12%, or any other suitable value. If the value of the RTT KPI is less than the RTT High Threshold and the value of the Loss KPI is less than the Loss High Threshold (Loss<Thr_Loss_high), method 300 proceeds to step 330 (i.e., a determination is made not to detect a congestion condition even though the value of the Data Erlang parameter indicates the presence of congestion). If the value of the RTT KPI is not less than the RTT High Threshold or the value of the Loss KPI is not less than the Loss High Threshold (Loss<Thr_Loss_high), method 300 proceeds to step 335 (i.e., a determination is made to detect a congestion condition since evaluation of the RTT KPI and Loss KPI indicators indicates the presence of congestion).

At step 320, a determination is made as to whether the value of the User Throughput KPI is between the User Throughput High Threshold and the User Throughput Low Threshold (Thr_Thp_low<User_Throughput<Thr_Thp_high). For example, the User Throughput Low Threshold may be 500 kbps, 400 Kbps, or any other suitable value. If the value of the User Throughput KPI is between the User Throughput High Threshold and the User Throughput Low Threshold, method 300 proceeds to step 325. If the value of the User Throughput KPI is not between the User Throughput High Threshold and the User Throughput Low Threshold (i.e., the value of the User Throughput KPI is less than the User Throughput Low Threshold), method 300 proceeds to step 335 (i.e., a determination is made to detect a congestion condition since evaluation of the User Throughput KPI indicator indicates the presence of congestion).

At step 325, a determination is made as to whether the value of the RTT KPI is less than the RTT Low Threshold (RTT<Thr_RTT_low) and the value of the Loss KPI is less than the Loss Low Threshold (Loss<Thr_Loss_low). For example, the RTT Low Threshold may be 1000 ms, 900 ms, or any other suitable value. For example, the Loss Low Threshold may be 5%, 4%, or any other suitable value. If the value of the RTT KPI is less than the RTT Low Threshold and the value of the Loss KPI is less than the Loss Low Threshold (Loss<Thr_Loss_low), method 300 proceeds to step 330 (i.e., a determination is made not to detect a congestion condition even though the value of the Data Erlang parameter indicates the presence of congestion). If the value of the RTT KPI is not less than the RTT Low Threshold or the value of the Loss KPI is not less than the Loss Low Threshold (Loss<Thr_Loss_low), method 300 proceeds to step 335 (i.e., a determination is made to detect a congestion condition since evaluation of the RTT KPI and Loss KPI indicators indicates the presence of congestion).

At step 330, a determination is made not to detect a congestion condition. In this case, even though the value of the Data Erlang parameter indicates the presence of congestion in the network, evaluation of one or more of the user QoE KPIs provides a more accurate indication that the network is not congested and, thus, that a congestion condition is not to be detected. This also may provide an indication that a congestion alert is not to be generated. From step 330, method 300 proceeds to step 399 where method 300 ends.

At step 335, a determination is made to detect a congestion condition. In this case, the determination to detect the congestion condition is based not just on a determination that the value of the Data Erlang parameter indicates the presence of congestion in the network; rather, the determination to detect the congestion condition also is based on evaluation of one or more of the user QoE KPIs, thereby providing a more accurate indication that the network is congested and, thus, that a congestion condition is to be detected. This also may provide an indication that one or more other actions are to be initiated responsive to detection of the congestion condition. From step 335, method 300 proceeds to step 399 where method 300 ends.

At step 399, method 300 ends.

It will be appreciated that, although primarily depicted and described with respect to embodiments in which a single congestion level is defined for use in detecting congestion, in at least some embodiments multiple congestion levels may be defined for use in detecting congestion. The multiple congestion levels may be defined based on multiple resource utilization levels (e.g., based on multiple resource utilization thresholds used for evaluating resource utilization within the network) and, thus, also may be referred to as resource utilization levels. In at least some embodiments, the evaluation of the one or more user QoE indicators may be the same across the different congestion levels. In at least some embodiments, the evaluation of the one or more user QoE indicators may vary across some or all of the different congestion levels. For example, one or more of the following may vary across some or all of the different congestion levels: the number of user QoE indicators used for a given congestion level, the type(s) of user QoE indicator(s) used for a given congestion level, the number of threshold values used for evaluating the user QoE indictor(s) for a given congestion level, the value(s) of the threshold(s) used for evaluating the user QoE indicators for a given congestion level, or the like. Thus, the manner in which user QoE indicators are evaluated for purposes of determining whether congestion is detected may vary across congestion levels.

It will be appreciated that, although primarily depicted and described herein with respect to embodiments in which the congestion detection capability includes detecting a congestion condition based on resource utilization information and determining whether to generate a congestion alert for the congestion condition based on one or more user QoE indicators, the congestion detection capability may equivalently or alternatively be considered to include determining whether the network is potentially experiencing a congestion condition based on resource utilization information associated with the network and determining whether the network is actually experiencing a congestion condition based on one or more user QoE indicators associated with the network.

It will be appreciated that, although primarily depicted and described herein with respect to embodiments in which the congestion detection capability is provided within specific types of communication networks, various embodiments of the congestion detection capability may be provided within various other types of communication networks (e.g., various types of wireless communication networks, various types of wireline communication networks, or the like, as well as various combinations thereof).

It will be appreciated that various embodiments of congestion detection capability may provide various improvements in detection of congestion in communication networks. In at least some embodiments, the congestion detection capability provides more accurate detection of congestion conditions in a network, thereby preventing false detection of congestion in the network when the network is not actually congested. In at least some embodiments, the congestion detection capability provides real-time or near-real-time congestion alerts such that appropriate actions to alleviate congestion may be initiated in real time or near real time as well. In at least some embodiments, given the explosion of data in various types of communication networks, the congestion detection capability may provide significant savings for service providers (e.g., in terms of investments for new equipment, additional spectrum, or the like). Various other advantages of the congestion detection capability are contemplated.

Figure 4:
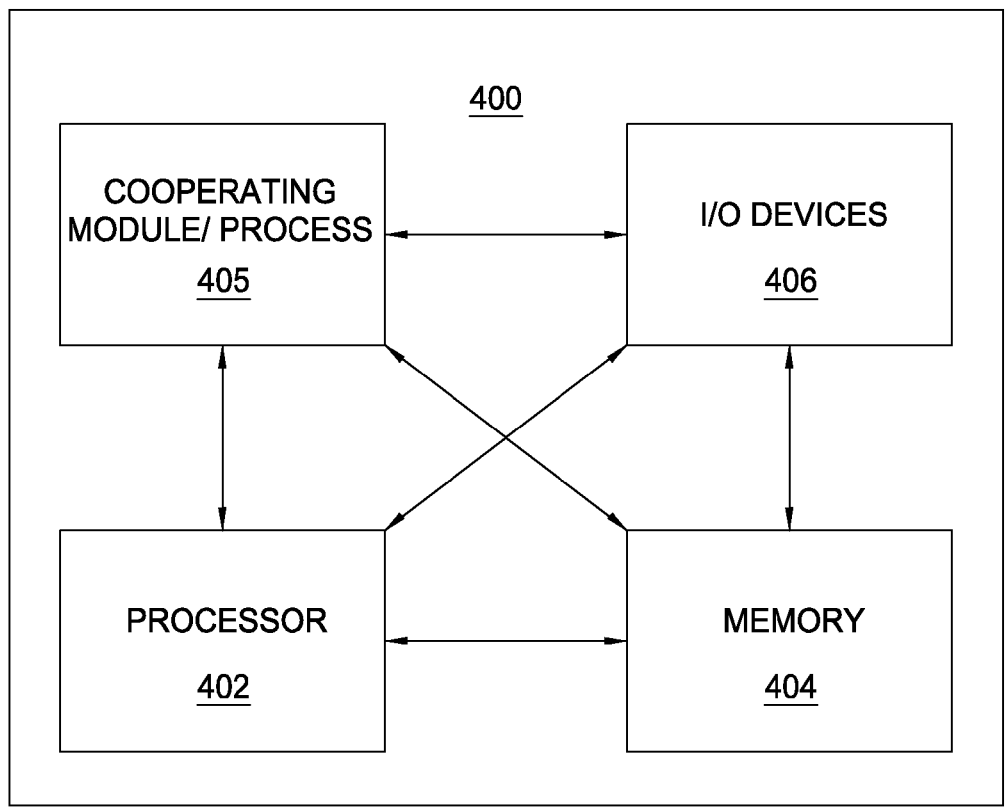
FIG. 4 depicts a high-level block diagram of a computer suitable for use in performing functions presented herein.

FIG. 4 depicts a high-level block diagram of a computer suitable for use in performing functions described herein.

The computer 400 includes a processor 402 (e.g., a central processing unit (CPU) and/or other suitable processor(s)) and a memory 404 (e.g., random access memory (RAM), read only memory (ROM), and the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, computer 400 provides a general architecture and functionality suitable for implementing one or more of a UE 102, a WAN 106, an element or elements of RAN 105, an element or elements of WCN 107, an element or elements of PDN 110, CDM 120, a portion of CDM 120, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   a processor and a memory communicatively connected to the processor, the processor configured to:
   detect an indication of congestion in a network based on resource utilization information associated with the network, wherein the resource utilization information comprises a resource utilization value;
   select, from a plurality of sets of user quality-of-experience (QoE) indicators based on evaluation of the resource utilization value with respect to a set of resource utilization thresholds, a selected set of user QoE indicators; and
   determine, responsive to the detection of the indication of congestion in the network and based on evaluation of one or more user QoE indicators in the selected set of user QoE indicators, whether to detect a congestion condition for the indication of congestion in the network or whether to prevent detection of a congestion condition for the indication of congestion in the network.

2. The apparatus of claim 1, wherein
the selected set of user QoE indicators comprises a user throughput parameter, a round trip time (RTT) parameter, and a loss parameter.

3. The apparatus of claim 1, wherein the set of resource utilization thresholds defines a set of congestion levels, wherein the set of congestion levels comprises a first congestion level and a second congestion level, wherein the first congestion level has associated therewith a first one of the sets of user QoE indicators from the plurality of sets of user QoE indicators and the second congestion level has associated therewith a second one of the sets of user QoE indicators from the plurality of sets of user QoE indicators.

4. The apparatus of claim 3, wherein evaluation of one or more user QoE indicators of the first one of the sets of user QoE indicators for the first congestion level is different than evaluation of one or more user QoE indicators of the second one of the sets of user QoE indicators for the second congestion level.

5. The apparatus of claim 3, wherein the first one of the sets of user QoE indicators and the second one of the sets of user QoE indicators are different.

6. The apparatus of claim 3, wherein, for a common user QoE indicator that is common to the first one of the sets of user QoE indicators and the second one of the sets of user QoE indicators, a first set of thresholds is used for evaluating the common user QoE indicator for the first congestion level and a second set of thresholds is used for evaluating the common user QoE indicator for the second congestion level.

7. The apparatus of claim 1, wherein each of the one or more user QoE indicators in the selected set of user QoE indicators has associated therewith a respective threshold level for evaluation of the respective one or more user QoE indicators.

8. The apparatus of claim 1, wherein the one or more user QoE indicators in the selected set of user QoE indicators comprise at least one of a user throughput parameter, a round trip time (RTT) parameter, or a loss parameter.

9. The apparatus of claim 1, wherein the processor is configured to:
detect a congestion condition for the indication of congestion in the network based on evaluation of the one or more user QoE indicators in the selected set of user QoE indicators.

10. The apparatus of claim 9, wherein the processor is configured to perform at least one of:
generate a congestion alert based on the detected congestion condition; or
initiate, based on the detected congestion condition, a corrective action for alleviating the detected congestion condition.

11. The apparatus of claim 1, wherein the network comprises a wireless network, wherein the indication of congestion is for a cell of the wireless network, wherein the resource utilization information comprises information indicative of utilization of an air interface of the cell of the wireless network, wherein the one or more user QoE indicators are associated with the cell of the wireless network.

12. A method, comprising:
using a processor and a memory for:
detecting an indication of congestion in a network based on resource utilization information associated with the network, wherein the resource utilization information comprises a resource utilization value;
selecting, from a plurality of sets of user quality-of-experience (QoE) indicators based on evaluation of the resource utilization value with respect to a set of resource utilization thresholds, a selected set of user QoE indicators; and
determining, responsive to the detection of the indication of congestion in the network and based on evaluation of one or more user QoE indicators in the selected set of user QoE indicators, whether to detect a congestion condition for the indication of congestion in the network or whether to prevent detection of a congestion condition for the indication of congestion in the network.

13. The method of claim 12, wherein
the selected set of user QoE indicators comprises a user throughput parameter, a round trip time (RTT) parameter, and a loss parameter.

14. The method of claim 12, wherein the set of resource utilization thresholds defines a set of congestion levels, wherein the set of congestion levels comprises a first congestion level and a second congestion level, wherein the first congestion level has associated therewith a first one of the sets of user QoE indicators from the plurality of sets of user QoE indicators and the second congestion level has associated therewith a second one of the sets of user QoE indicators from the plurality of sets of user QoE indicators.

15. The method of claim 14, wherein evaluation of one or more user QoE indicators of the first one of the sets of user QoE indicators for the first congestion level is different than evaluation of one or more user QoE indicators of the second one of the sets of user QoE indicators for the second congestion level.

16. The method of claim 14, wherein the first one of the sets of user QoE indicators and the second one of the sets of user QoE indicators are different.

17. The method of claim 14, wherein, for a common user QoE indicator that is common to the first one of the sets of user QoE indicators and the second one of the sets of user QoE indicators, a first set of thresholds is used for evaluating the common user QoE indicator for the first congestion level and a second set of thresholds is used for evaluating the common user QoE indicator for the second congestion level.

18. The method of claim 12, wherein each of the one or more user QoE indicators in the selected set of user QoE indicators has associated therewith a respective threshold level for evaluation of the respective one or more user QoE indicators.

19. The method of claim 12, wherein the one or more user QoE indicators in the selected set of user QoE indicators comprise at least one of a user throughput parameter, a round trip time (RTT) parameter, or a loss parameter.

20. The method of claim 12, further comprising:
detect a congestion condition for the indication of congestion in the network based on evaluation of the one or more user QoE indicators in the selected set of user QoE indicators.

21. The method of claim 20, further comprising at least one of:
generating a congestion alert based on the detected congestion condition; or
initiating, based on the detected congestion condition, an action for alleviating the detected congestion condition.

22. The method of claim 12, wherein the network comprises a wireless network, wherein the indication of congestion is for a cell of the wireless network, wherein the resource utilization information comprises information indicative of utilization of an air interface of the cell of the wireless network, wherein the one or more user QoE indicators are associated with the cell of the wireless network.

23. A non-transitory computer-readable storage medium storing instructions which, when executed by a computer, cause the computer to perform a method, the method comprising:
- detecting an indication of congestion in a network based on resource utilization information associated with the network, wherein the resource utilization information comprises a resource utilization value;
- selecting, from a plurality of sets of user quality-of-experience (QoE) indicators based on evaluation of the resource utilization value with respect to a set of resource utilization thresholds, a selected set of user QoE indicators; and
- determining, responsive to the detection of the indication of congestion in the network and based on evaluation of one or more user QoE indicators in the selected set of user QoE indicators, whether to detect a congestion condition for the indication of congestion in the network or whether to prevent detection of a congestion condition for the indication of congestion in the network.

24. The apparatus of claim 1, wherein the processor is configured to:
- prevent detection of a congestion condition for the indication of congestion in the network based on evaluation of the one or more user QoE indicators in the selected set of user QoE indicators.

25. The apparatus of claim 24, wherein the one or more user QoE indicators in the selected set of user QoE indicators comprise a user throughput parameter, a round trip time (RTT) parameter, and a loss parameter.

* * * * *